(12) United States Patent
Antens et al.

(10) Patent No.: US 8,702,834 B2
(45) Date of Patent: Apr. 22, 2014

(54) SULPHUR-CONTAINING FERTILIZERS AND PROCESS FOR THE PREPARATION THEREOF

(75) Inventors: Jany Birgitta Maria Antens, Eindhoven (NL); Rafael Alberto Garcia Martinez, Calgary (CA); Reginald Lambert, Calgary (CA); Jason Trevor O'Brien, Pinkenba (AU); Marinus Johannes Reynhout, Amsterdam (NL); Guy Lode Magda Maria Verbist, Amsterdam (NL); John Woodruffe, Calgary (CA)

(73) Assignee: Shell Oil Company, Houston, TX (US)

( * ) Notice: Subject to any disclaimer, the term of this patent is extended or adjusted under 35 U.S.C. 154(b) by 268 days.

(21) Appl. No.: 13/146,451

(22) PCT Filed: Jan. 29, 2010

(86) PCT No.: PCT/EP2010/051048
§ 371 (c)(1), (2), (4) Date: Aug. 29, 2011

(87) PCT Pub. No.: WO2010/086396
PCT Pub. Date: Aug. 5, 2010

(65) Prior Publication Data
US 2011/0302975 A1    Dec. 15, 2011

(30) Foreign Application Priority Data
Jan. 29, 2009 (EP) .................................. 09151602

(51) Int. Cl.
*C05B 7/00* (2006.01)
*C05B 17/00* (2006.01)
(52) U.S. Cl.
USPC ............... 71/33; 71/34; 71/35; 71/48; 71/49; 71/64.03

(58) Field of Classification Search
USPC ............ 71/32–53, 64.03; 516/198–204
See application file for complete search history.

(56) References Cited

U.S. PATENT DOCUMENTS

| | | | | |
|---|---|---|---|---|
| 3,333,939 | A | 8/1967 | Davis et al. | 71/29 |
| 3,926,841 | A | 12/1975 | Habasko et al. | 252/383 |
| 4,133,668 | A * | 1/1979 | Young | 71/11 |
| 4,372,872 | A * | 2/1983 | Backlund | 516/96 |
| 4,377,406 | A | 3/1983 | Achorn et al. | 71/36 |

(Continued)

FOREIGN PATENT DOCUMENTS

| | | | | |
|---|---|---|---|---|
| DE | 1592609 | 2/1970 | | C05G 1/00 |
| FR | 2090752 | 1/1972 | | B01J 2/00 |

(Continued)

*Primary Examiner* — Wayne Langel
(74) *Attorney, Agent, or Firm* — Charles W. Stewart

(57) ABSTRACT

According to the present invention, there is provided a process for the manufacture of sulphur-containing fertilizer compositions, said process comprising the steps of: a) providing a slurry of at least one phosphate-based fertilizer material selected from the group consisting of ammonium phosphates, ammonium phosphate based nitrogen-phosphorus-potassium (NPK) compounds, super phosphates and partially acidulated phosphate rocks; b} bringing said slurry into contact with at least one surfactant and elemental sulphur; and c) introducing the mixture obtained in step b) into a granulator unit in order to obtain granules of the fertilizer composition, wherein the elemental sulphur is present in an amount in the range of form 1 to 25 wt. %, based on the total weight of the fertilizer composition The present invention also provides a fertilizer composition.

12 Claims, 2 Drawing Sheets

(56) References Cited

U.S. PATENT DOCUMENTS

| | | | |
|---|---|---|---|
| 4,762,546 A | 8/1988 | Boles | 71/30 |
| 5,423,897 A | 6/1995 | Hudson et al. | 71/28 |
| 5,466,274 A * | 11/1995 | Hudson et al. | 71/28 |
| 5,571,303 A | 11/1996 | Bexton | 71/34 |
| 5,653,782 A | 8/1997 | Stern et al. | 71/53 |
| 5,753,731 A * | 5/1998 | Yoshioka et al. | 524/198 |
| 5,968,222 A * | 10/1999 | Kodali | 71/64.07 |
| 6,121,200 A * | 9/2000 | Berger et al. | 504/206 |
| 6,273,929 B1 * | 8/2001 | Hobbs | 71/64.03 |
| 7,416,678 B2 * | 8/2008 | Aratani | 252/8.61 |
| 7,771,505 B2 * | 8/2010 | Ogle et al. | 71/28 |
| 2003/0172699 A1 * | 9/2003 | Phinney | 71/64.03 |
| 2006/0178440 A1 * | 8/2006 | Blease | 516/77 |

FOREIGN PATENT DOCUMENTS

| | | | |
|---|---|---|---|
| GB | 1312314 | 4/1973 | C05G 3/00 |
| WO | WO9003350 | 4/1990 | C05D 9/00 |
| WO | WO9627571 | 9/1996 | C05B 1/00 |
| WO | WO9716396 | 5/1997 | C05G 3/00 |
| WO | WO9954029 | 10/1999 | B01J 2/14 |
| WO | WO02090295 | 11/2002 | C05G 3/10 |
| WO | WO 03/037496 * | 5/2003 | |
| WO | WO03106376 | 12/2003 | C05C 9/00 |
| WO | 2004/043878 * | 5/2004 | |
| WO | WO2004043878 | 5/2004 | C05B 7/00 |
| WO | WO2008084495 | 7/2008 | |
| WO | WO2008084496 | 7/2008 | C07D 221/14 |
| WO | WO2009051496 | 4/2009 | C05D 9/00 |

* cited by examiner

SULPHUR-CONTAINING FERTILIZERS AND PROCESS FOR THE PREPARATION THEREOF

PRIORITY CLAIM

The present application claims priority from PCT/EP2010/051048, filed 29 Jan. 2010, which claims priority from European Application 09151602.1, filed 29 Jan. 2009.

FIELD OF THE INVENTION

The present invention relates to sulphur-containing fertilizers and a process for the preparation thereof.

BACKGROUND OF THE INVENTION

In the past a large amount of work has been devoted to the manufacture of sulphur-containing fertilizers. The growing worldwide demand for sulphur-containing fertilizers stems from the discovery that low crop yields in certain cases may be related to deficiencies in sulphur in the soil. An example of a species with high sulphur requirements is Canola. Canola is an important cash crop in Alberta, Canada, and has high sulphur requirements at any growth stage. A shortage of sulphur can cause serious reductions in crop yield and quality, Manufacturing processes for sulphur-containing fertilizers of the ammonium phosphate type often involve the use or incorporation of sulphates, see e.g. U.S. Pat. No. 4,377,406, or U.S. Pat. No. 4,762,546. A disadvantage of sulphates is that they are very mobile in the soil and easily leach out of the root zone, effectively making the sulphate nutrient unavailable to the plants.

Elemental sulphur is not leached out of the soil, as sulphates are. Instead, micron sized elemental sulphur particles are oxidized to sulphate sulphur, which is the form utilized by the plants, by soil bacteria during the cropping season. Elemental sulphur is, thus, considered a slow release form of plant nutrient sulphur that is less prone to leaching out of the crops root zone. It is, therefore, advantageous to have a large proportion of the sulphur in fertilizers present as elemental sulphur present as small particles. Furthermore, elemental sulphur offers some additional benefits in agriculture, including acting as a fungicide against certain micro organisms, acting as a pesticide against certain soil and plant pests, assisting the decomposition of plant residues and improving phosphorus and nitrogen nutrient utilization and reducing the pH of alkaline and calcareous soils.

Thus, it is advantageous to incorporate sulphur in sulphur-containing fertilizers as elemental sulphur.

Processes for the manufacture of sulphur-containing fertilizers, wherein elemental sulphur is used, are known in the art. Most of the methods involve the incorporation of molten sulphur into the fertilizer.

In U.S. Pat. No. 5,653,782, a process for the manufacture of sulphur-containing fertilizers has been described, wherein a substrate containing fertilizer particles is heated to a temperature above the melting point of sulphur and admixed with sulphur. According to U.S. Pat. No. 5,653,782, the sulphur is melted by the heat provided by the preheated fertilizer particles, thereby producing a homogeneous coating on the fertilizer particles.

U.S. Pat. No. 3,333,939, describes the coating of ammonium phosphate granules with molten sulphur. The granules are coated in a separate coating unit into which the sulphur is fed, by contacting the granules with molten sulphur or with a solution of ammonium polysulphide. Subsequently, the coated granules are dried.

Alternatively, U.S. Pat. No. 3,333,939 teaches a process for preparing sulphur-containing fertilizer particles in which the sulphur is interspersed throughout the particles. In this process ammonia and phosphoric acid are allowed to react to form ammonium phosphate. The ammonium phosphate formed is fed into a granulator in which it is mixed with urea and dry sulphur. The granules obtained are dried in a dryer.

The disadvantage of the first process of U.S. Pat. No. 3,333,939 is that the coating prevents a uniform distribution of ammonium sulphate and sulphur into the soil. The second process has the disadvantage that it requires solid sulphur handling. The handling and grinding of solid elemental sulphur is highly hazardous due to the generation of sulphur dust and risks of sulphur dust fires and explosions. As mentioned in a review by H. P. Rothbaum et al (New Zealand Journal of Science, 1980, vol. 23, 377), explosion hazards are always due to sulphur dust which is inflammable. Therefore, a complex process design is necessary to ensure the safety of the process.

U.S. Pat. No. 5,571,303 discloses a process for the manufacture of fertilizers in which first ammonia, water and phosphoric acid are reacted to form ammonium phosphate. Subsequently, the ammonium phosphate/water mixture is mixed with molten sulphur. The mixture thus obtained is kept at temperatures of 120-150° C. until granulation. A disadvantage of this process is safety, that is elevated sulphur concentrations in process dusts may lead to potentially explosive dust-air mixtures.

EP 1560801 A1 discloses a process for the manufacture of sulphur-containing ammonium phosphate fertilizers comprising combining elemental sulphur, in the liquid form, with ammonia, phosphoric acid and water.

WO 2008/084495 relates to an agricultural composition comprising an effective amount of sulphur active ingredient and at least one dispersing agent. The compositions as disclosed in WO 2008/084496 typically have a high sulphur content, viz. in the range of about 40% to about 98 wt. % (w/w).

WO 90/03350 discloses a sulphur-based chemical soil-corrective in the form of pellets for agricultural use, said product comprising fly sulphur powder, at least 3 wt. % of an inert product selected from the group consisting of clay, bentonite, kaolin and mixtures thereof, and at least 0.5 wt. % of a wetting agent, said components being mixed with one another and subjected to wet extrusion and subsequent drying to obtain said pellets. As WO 90/03350 relates to the handling of sulphur powder which is subjected to extrusion (rather than granulation as used according to the present invention) the teachings therein are not relevant for the process according to the present invention.

Several prior art documents, e.g. GB 1312314, WO 97/16396, WO 02/090295, U.S. Pat. No. 5,423,897 and U.S. Pat. No. 3,926,841 have disclosed the use of coating agents, incorporating surfactants, in the reduction of dust formation and caking during use and handling of NPK-type fertilizers.

Regardless of the improvements disclosed in the art, problems with the manufacture of phosphate-based fertilizers containing elemental sulphur, continue to be in existence. In particular, dust and explosion hazards involving elemental sulphur dust continue to be of great concern. Therefore, there remains a need for fertilizers and manufacturing processes for such fertilizers which would diminish or even prevent the safety problems experienced in the art.

SUMMARY OF THE INVENTION

According to the present invention, there is provided a process for the manufacture of sulphur-containing fertilizer compositions, said process comprising the steps of:
- a) providing a slurry of at least one phosphate-based fertilizer material selected from the group consisting of ammonium phosphates, ammonium phosphate based nitrogen-phosphorus-potassium (NPK) compounds, super phosphates and partially acidulated phosphate rocks;
- b) bringing said slurry into contact with at least one surfactant and (preferably a liquid phase of) elemental sulphur; and
- c) introducing the mixture obtained in step b) into a granulator unit in order to obtain granules of the fertilizer composition, wherein the elemental sulphur is present in an amount in the range of from 1 to 25 wt. %, based on the total weight of the fertilizer composition.

The present invention also provides a fertilizer composition comprising:
- a) elemental sulphur in an amount in the range of from 1 to 25 wt. %, based on the total weight of the fertilizer composition;
- b) at least one phosphate-based fertilizer material selected from the group consisting of ammonium phosphates, ammonium phosphate based nitrogen-phosphorus-potassium (NPK) compounds, super phosphates and partially acidulated phosphate rocks; and
- c) at least one surfactant, wherein the surfactant is dispersed throughout the fertilizer composition.

DETAILED DESCRIPTION OF THE INVENTION

Figure 1:
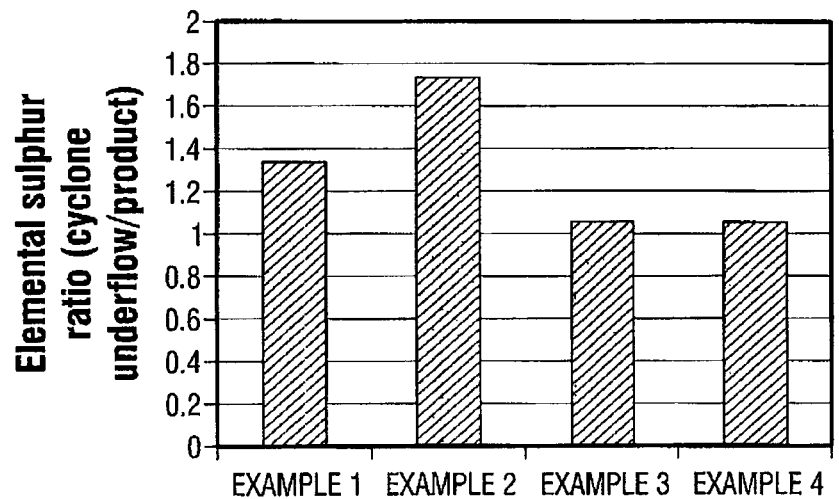
FIG. 1 presents the elemental sulphur ratios between the cyclone underflows and various products.

It has now surprisingly been found that a reduction of elemental sulphur concentration in dusts generated during manufacturing and handling of sulphur-containing fertilizers, and its associated hazards (e.g. respiratory and explosion risks) can be achieved during the production of sulphur-containing phosphate-based fertilizers, if at least one surfactant is added and dispersed throughout the fertilizer composition during production.

The elemental sulphur used in the fertilizer composition and process of the present invention can be obtained from any suitable source. In one embodiment of the present invention, the elemental sulphur is obtained from an industrial process, such as the removal of unwanted sulphur components from natural gas.

The elemental sulphur used may be high purity (>99.9% S) chemical sulphur as obtained from the Claus process. However, the process of the present invention can use elemental sulphur of significantly less purity than this. Examples of such elemental sulphur containing materials are sulphur filter cake as obtained from sulphur melting and filtration operations and sulphur obtained from a various chemical and biological $H_2S$ gas removal processes. Typically, such sulphur sources may contain anywhere in the range of from 30 to 99.9 wt. %, preferably from 50 to 99.5 wt. %, more preferably from 60 to 99.0 wt. %, sulphur.

The elemental sulphur is present in the fertilizer composition in an amount in the range of from 1 to 25 wt. %, based on the total weight of the fertilizer composition, preferably in the range of from 2 to 18 wt. %, more preferably in the range of from 5 to 15 wt. %. The most homogeneous distribution of sulphur in and throughout the granules is achieved when the content of elemental sulphur is in the range of from 5 to 15 wt. %, based on the total fertilizer composition.

The phosphate-based fertilizer material used in the composition and process of the present invention is selected from the group consisting of ammonium phosphates, ammonium phosphate based nitrogen-phosphorus-potassium (NPK) compounds, super phosphates and partially acidulated phosphate rocks. Examples of suitable ammonium phosphates are mono-ammonium phosphates and di-ammonium phosphates. Suitable super phosphates, include, but are not limited to, normal superphosphates and triple superphosphates.

It will be apparent to the skilled person that the choice of phosphate-based fertilizer material will depend on the end use of the fertilizer composition.

In a preferred embodiment of the present invention, the at least one phosphate-based fertilizer material comprises at least one ammonium phosphate.

Typically, the phosphate-based fertilizer material is present in an amount of at least 50 wt. %, preferably in a range of from 50 to 99 wt. %, based on the total weight of the fertilizer composition.

Preferably, the at least one surfactant used in the present invention is a cationic or an amphoteric surfactant. As used herein, the terms 'cationic surfactant' and 'amphoteric surfactant' refer to compounds present in their cationic or amphoteric form as well as those that will be converted into their cationic or amphoteric form (e.g. by protonation or alkylation) in situ.

Suitable cationic surfactants include, but are not limited to, nitrogen-containing cationic surfactants. Nitrogen-containing cationic surfactants will generally be selected from the group of aliphatic nitriles (RCN), aliphatic amides ($RCONH_2$), aliphatic amines (e.g. $RNH_2$, RRNH, $R(CH_3)_2$N, $R(CH_3)_3N^+$, $RR(CH_3)N$, $R_3N$), aliphatic polyamines $((RNHR')_nNH_2)$, beta primary aliphatic amines (e.g. RCH$(NH_2)CH_3$), beta aliphatic polyamines aryl aliphatic amines (e.g. $R(C_6H_5)NH_2$ include the benzyl derivatives e.g. $RN(CH_3)_2CH_2C_6H_5$), etheramines (e.g. $ROR'NH_2$) or non-aromatic cyclic amines (e.g. alkylimidazolines and alkyl morpholines), or derivatives of any of compounds listed above, such as their salts, ethylene or propylene oxide adducts or quaternary ammonium salts.

Especially preferred cationic surfactants are fatty amine alkoxylates represented by the general formula $R^1NR^2R^3$, wherein $R^1$ is an aliphatic moiety containing from 12 to 20 carbon atoms and $R^2$ and $R^3$ are each independently aliphatic moieties containing from 2 to 25 ethoxy/propoxy units. Preferably $R^2$ and $R^3$ are identical.

Suitable amphoteric surfactants include, but are not limited to, nitrogen-containing amphoteric surfactants. These may be selected from the group consisting of amine oxides ($RNH_2O$, $RNH(CH_3)O$, $RN(CH_3)_2O$), betaine derivatives (e.g. RNH ($CH_2CO_2$) $RN(CH_3)(CH_2CO_2)$ or $RN(CH_3)_2(CH_2CO_2)$) alkylamido-propylbetaines (e.g. $RCONHR'N(CH_3)_2$ ($CH_2CO_2$)), sultaines (e.g. $RN(CH_3)_2R'SO_3$ or $RCONHR'N$ $(CH_3)_2$ $CH_2CH(OH)CH_2SO_3$)), Lecithins (e.g. $(CH_3)_3$ $NR'OP(O)_2OCH_2CH(OCO_2R)CH_2OCO_2R$ or partially hydrolysed derivatives thereof) or derivatives of any of compounds listed above, such as their salts, ethylene or propylene oxide adducts or quaternary ammonium salts.

As used herein, R represents substituted or unsubstituted aliphatic radicals of from 8 to 22, preferably 12 to 20, more preferably 16 to 20, carbon atoms, R' represents an alkyl radical of from 2 to 4 carbon atoms and n represents an integer of from 1 to 3.

Preferably, the at least one surfactant is selected from aliphatic amines (e.g. $RNH_2$, $RRNH$, $R(CH_3)_2N$, $R(CH_3)_2N^+$, $RR(CH_3)N$, $R_3N$) and their ethylene or propylene oxide adducts. In a particularly preferred embodiment of the present invention, the at least one surfactant is a ethylene or propylene oxide adduct of an aliphatic amine, wherein R is an aliphatic radical containing in the range of from 12 to 20 carbon atoms, more preferably from 16 to 20 carbon atoms. In this embodiment the ethylene or propylene oxide adduct of an aliphatic amine is more preferably the ethylene or propylene oxide adduct of a tallow amine.

Suitably, the at least one surfactant is present in an amount of at least 0.0001 wt. %, preferably at least 0.001 wt. %, more preferably at least 0.005 wt. %, even more preferably at least 0.008 wt. %, yet even more preferably at least 0.01 wt. % with respect to the weight of the overall fertilizer composition. Suitably, the at least one surfactant is present in an amount of at most 3 wt. %, preferably at most 2 wt. %, more preferably 0.1 wt. %, even more preferably at most 0.09 wt. %, even more preferably at most 0.08 wt. %, even more preferably at most 0.07 wt. % and most preferably at most 0.05 wt. % with respect to the weight of the overall fertilizer composition.

Other ingredients may be incorporated into the fertilizer composition of the present invention, in order to tailor the fertilizer composition to its intended end-use. Examples include plant micronutrients such as boron, selenium, sodium, zinc, manganese, iron, copper, molybdenum, cobalt, calcium, magnesium and combinations thereof. These nutrients may be supplied in elemental form or in the form of salts, for examples as sulphates, nitrates, oxides or halides. In this way, granules enriched in plant nutrients are obtained. The amount of plant micronutrients depends on the type of fertilizer needed and is typically in the range of from 0.1 to 5 wt. %, based on the total weight of the granules.

In the process of the present invention, the slurry of at least one phosphate-based fertilizer material is typically a slurry in water. This may be formed by the mixing of the required phosphate-based fertilizer material or materials and water or may be formed by the in-situ production of the phosphate-based fertilizer material in an aqueous medium.

An example of the latter is the production of an ammonium phosphate or other phosphate-base NPK compound by reacting ammonia, phosphoric acid and water in a reactor unit. In such an embodiment of the present invention, the phosphoric acid is typically manufactured by reacting sulphuric acid with phosphate rock or is commercially available phosphoric acid. To avoid the introduction of excess process water, the ammonia may be introduced as a concentrated aqueous solution or as anhydrous gaseous or liquid ammonia, preferably as anhydrous ammonia. The advantage of having a mixture with as little water as possible is that any additional water introduced into a fertilizer process must be handled in the process and eliminated at a later stage. Preferably, the water content in the ammonium phosphate mixture is kept as low as possible, preferably in the range of from 10 to 20 wt. % based on the total weight of the mixture, more preferably in the range of from 12 to 15 wt. % based on the total weight of the mixture.

The amounts of ammonia and phosphoric acid are adjusted to achieve a pumpable slurry suitable for granulation and the final desired product grade. For the production of sulphur-containing monoammonium phosphate (S-MAP), the molar ratio of nitrogen to phosphorous is typically kept between values in the range of from 0.4 to 0.7 when using a 'forward titration' mode and in the range of from 1.2 to 1.5 when using a 'back titration' mode. In both cases the final nitrogen-to-phosphorous molar ratio is adjusted to 1. For the production of sulphur-containing di-ammonium phosphate (S-DAP) the molar ratio of nitrogen to phosphorous is typically kept in the range of from 1.2 to 1.5, adjusted to a value in the range of from 1.8 to 2.0 for the final product.

Typically, the reaction takes place at atmospheric pressure and at temperatures in the range of from 100° C. to 150° C. Preferably, water or sulphuric acid is added to the reactor unit to control the temperature of the mixture. Typically, water may be added when a temperature reduction is needed and sulphuric acid may be added to when a temperature increase is needed and when some sulphate sulphur is desirable in the final fertilizer composition.

In one embodiment of the present invention, the liquid phase comprising sulphur comprises a slurry of sulphur particles in an aqueous medium (such as water, ammonium phosphate solution, phosphoric acid, ammonium sulphate or a combination thereof). In this embodiment, typically, the sulphur particles are dispersed or suspended in the slurry. Preferably, the sulphur particles have a size of at least 0.5 microns, preferably at least 5.0 microns, more preferably at least 10.0 microns, even more preferably at least 30 microns. Preferably, the sulphur particles have a size of at most 250 microns, preferably at most 200 microns, more preferably at most 150 microns, most preferably at most 100 microns. To avoid the removal of excess water at a later stage in the process, the water content in the sulphur slurry is typically kept as low as possible, preferably in the range of from 10 to 40 wt. % based on the total weight of the mixture, more preferably in the range of from 15 to 30 wt. % based on the total weight of the slurry. In the case where the sulphur particles are suspended in the slurry, the sulphur slurry is preferably stirred or mixed in a suitable apparatus to homogenise the slurry prior to introducing it into the manufacturing process.

In this embodiment, is preferred that the sulphur slurry contains sulphur particles which are dispersed in the aqueous medium. This type of slurry, henceforth referred to as dispersed or emulsified sulphur slurry, comprises dispersed sulphur particles in aqueous medium, preferably dispersed micron-sized sulphur particles in aqueous medium. The sulphur particles are suitably kept in dispersion through the addition of a suitable emulsifier and/or viscosity modifier to obtain a pumpable slurry. Suitable emulsifiers and viscosity modifiers are known in the art and are not critical to the invention. An advantage of using dispersed sulphur particles is that the settling of sulphur particles is kept to a minimum and the sulphur is distributed more homogeneously throughout the aqueous medium. Thus, the need for stirring or mixing prior to introducing the sulphur slurry into the reactor unit is reduced. Typically, the slurry is introduced by pumping the slurry from a sulphur slurry reservoir unit into a reactor unit.

In a preferred embodiment of the present invention, liquid phase comprising sulphur comprises molten sulphur. Molten sulphur can be obtained from solid sulphur, by melting in a suitable melting apparatus, for instance a tube melter.

The use of molten sulphur is advantageous when sulphur is obtained in the molten state from an industrial process. Processes for the removal of unwanted sulphur components from natural gas usually produce sulphur in the molten state and the use of this molten sulphur directly in the fertilizer manufacturing process according to the invention avoids the need for additional steps, such as forming and grinding of the sulphur, to obtain a sulphur slurry. An additional advantage of using molten sulphur is that no additional water is introduced into the fertilizer manufacturing process. When adding elemental sulphur in the molten state, the temperature of the sulphur-containing mixture is preferably kept above the melting point of sulphur, preferably at temperatures in the range of from 115° C. to 150° C. In a typical process, the molten sulphur is added into a reactor at this temperature, before the reaction mixture is introduced into a granulator.

The at least one surfactant may be provided in any form suitable for mixing with the sulphur in a liquid phase and/or the slurry of at least one phosphate-based fertilizer material.

The at least one surfactant may be added to the sulphur in a liquid phase, before it is brought into contact with the at least one phosphate-based fertilizer material. Alternatively, the at least one surfactant may be added directly to the slurry of at least one phosphate-based fertilizer material before or after it is brought into contact with the sulphur or may be added directly to the granulator.

In a preferred embodiment of the present invention the at least one surfactant is added directly to the slurry of at least one phosphate-based fertilizer material.

Reference herein to a granulator is to a device for forming granules or pellets of fertilizer product. Commonly used granulators are described in Perry's Chemical Engineers' Handbook, chapter 20 (1997). Preferred granulators are rotary drum granulators or pan granulators. Typically, the mixture is pumped and distributed on a rolling bed of material in a rotary drum granulator. In the granulator, granules are formed.

The sulphur in the sulphur-containing fertilizer compositions according to the invention may be incorporated into granules comprising the at least one phosphate-based fertilizer material, or the sulphur may be distributed on the granules or the sulphur may be both incorporated into the granules and be distributed on the granules.

Reference herein to granules is to discrete particles. These particles comprise the at least one phosphate-based fertilizer material, the at least one surfactant and elemental sulphur.

The at least one surfactant is dispersed throughout the fertilizer composition. That is, the at least one surfactant is incorporated throughout the granules and does not exist merely in a surface layer.

Optionally, water and steam can also be fed to the granulator to control the temperature of the granulation process as needed.

Additional ammonia and/or recycled fertilizer particles may be added to the granulator unit. Recycled fertilizer particles add granulation and nucleating agents. They are obtained from the final fertilizer product. Suitably they have small particle sizes (so-called off-spec fines). The recycle of fines is also described in U.S. Pat. No. 3,333,939.

The granules of the sulphur-containing fertilizer compositions obtained after the granulation step are optionally dried in a drying unit. In a preferred embodiment, the granules are air-dried in the drying unit, thereby avoiding the need for additional drying equipment. Alternatively, drying units wherein heat transfer for drying is accomplished by direct contact between the wet solid and hot gases are used, thereby enabling a faster drying step. Typically, the drying unit is a rotary dryer.

In a preferred process according to the invention, the granules are sorted on their size in a sorting (screening) unit to achieve a more uniform size distribution. Typically, oversized granules are crushed to less than 1 mm and along with undersized granules are returned to the granulator as so-called recycle material (or "off-spec fines"). A preferred size range for the granules is in the range of from 1.5 to 5.0 mm, more preferably in the range of from 2 to 4 mm, expressed as the average diameter of the granules. The use of granules which fall within this range is more likely to enable a more even distribution of the fertilizer ingredients in the soil after applying the granules to the soil.

It will be appreciated that the process parameters in the reactor unit and in the granulator unit have to be adjusted depending on the desired products.

After a typical manufacturing process according to the invention, sulphur-containing fertilizer compositions, optionally enriched in plant nutrients, are obtained.

EXAMPLES

The following non-limiting Examples will illustrate the invention. Examples 1 and 2 are not according to the present invention (no use of a surfactant), whilst Examples 3-10 are according to the present invention. The Examples were carried out as follows:

Examples 1 and 2 (Not According to the Present Invention)

During each example, phosphoric acid was fed into a pre-neutralizer (PN). Ammonia was then introduced into the PN. Molten elemental sulphur (ES) was prepared in a separate tank and was allowed to overflow into the top of the PN by gravity through an overflow line. The average molten sulphur temperature maintained throughout the test program was approximately 135° C.

The resultant ammonium phosphate/ES slurry was then transferred from the PN to a drum granulator. Gaseous ammonia was fed to the granulator via a sparger submerged under the rolling bed of material in the granulator. Recycle material was also fed to the granulator. The recycle material consisted of the undersize fraction from the screens and crushed oversize fractions. When necessary, to control granulation, product-size material was diverted back to the granulator.

Moist, granular material from the granulator was discharged into a rotary dryer operating at a rotational speed of 7 rpm. A cyclone-type dust collector was located in the process air duct between the dryer discharge and the exhaust fan.

The material was transferred from the dryer to a mechanically vibrated screen system in order to produce product material between 2.36 mm and 4.00 mm. Oversize material from the screen system was routed to a chain mill. The crushed material discharging from the chain mill was returned to the screen system. Undersize material from the screen system was returned to the granulator together with a controlled fraction of the product size material to maintain optimum granulation. The product-size fraction from the screen system was fed to a rotary cooler.

The apparatus was also fitted with a fugitive dust system in order to collect dust samples. The dryer cyclone and fugitive dust cyclone inlets were sampled twice for periods of 4 hours each. The samples were analysed in order to determine the sulphur content in the dust collected.

The airstream samples were analyzed for total sulphur (TS) and sulphate sulphur ($SO_4^+$—S) content. The ES values were obtained by subtracting the sulphate sulphur ($SO_4^+$—S) values from the total sulphur (TS) values.

Examples 3 and 4

These examples were carried out according to the method of Examples 1 and 2, above, except that Toximul TA5 (a cationic surfactant based on tallow amine ethoxylate, available from Stepan Company (Northfield, Ill., USA)) was added directly to the PN slurry using a peristaltic pump to achieve a desired concentration of 0.02 wt. % in the final product.

The results for each of the four Examples 1-4 are shown in FIG. 1, which demonstrates the elemental sulphur ratios between the cyclone underflow and the product of Examples 1 to 4.

Examples 5, 6, 7 and 8

Figure 2:
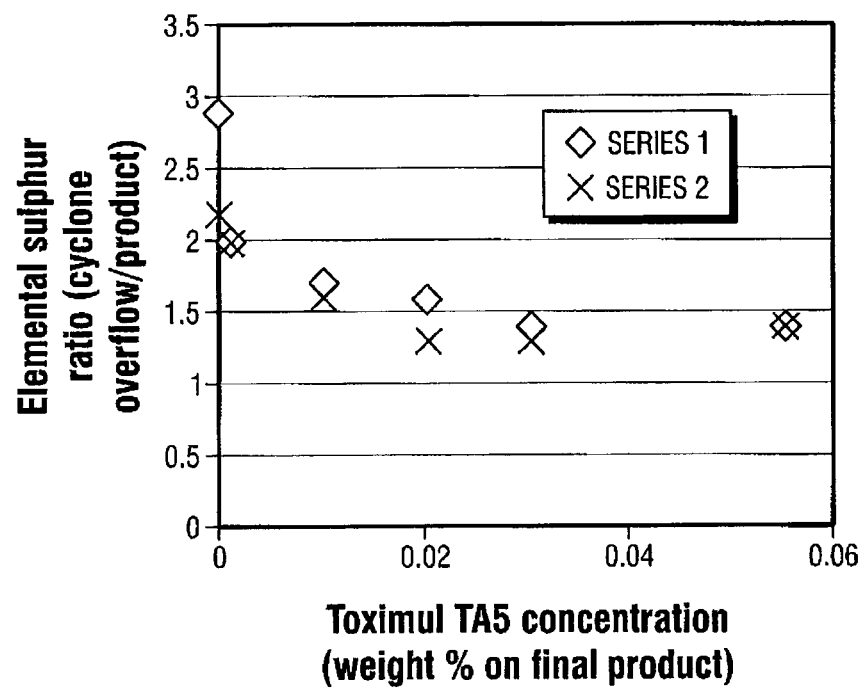
FIG. 2 presents the total sulphur ratio between the cyclone overflows and the product for a range of concentrations of the surfactant.
Figure 3:
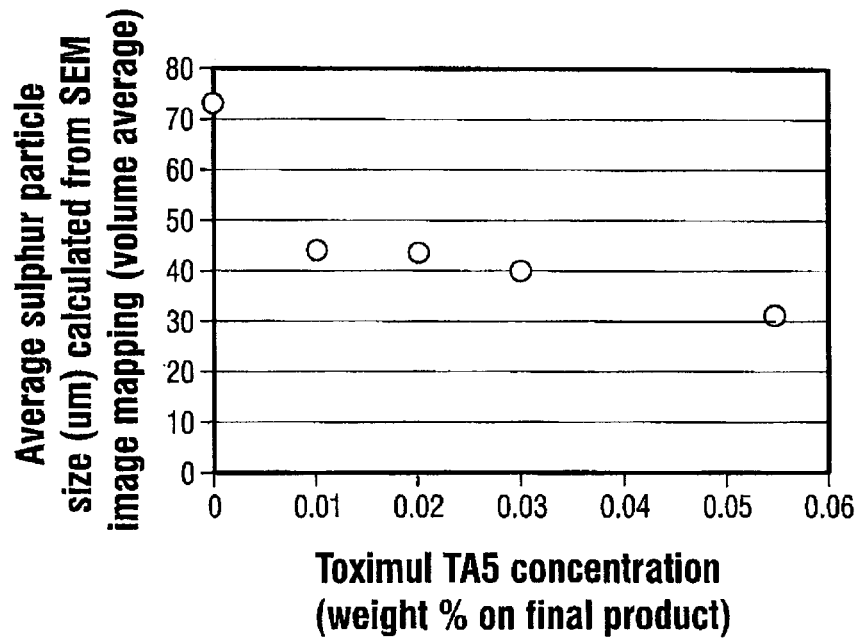
FIG. 3 presents the average particle size distribution of the sulphur particles for different surfactant concentrations.

The process of Examples 3 and 4 was repeated except that Toximul TA5 was added directly to the PN slurry using a peristaltic pump to achieve the desired concentrations shown in FIGS. 2 and 3 in the final product.

FIG. 2 shows the total sulphur ratio between the cyclone overflows and the product for a range of concentrations of the surfactant (i.c. Toximul TA5) as used in Examples 2 (0 wt. %), 4 (0.02 wt. %), 5 (0.001 wt. %), 6 (0.01 wt. %), 7 (0.3 wt. %) and 8 (0.055 wt. %), both for the dryer (Series 1) and the fugitive dust (Series 2) cyclone overflows. Total sulphur refers to the sum of elemental sulphur and sulphate sulphur.

FIG. 3 illustrates the average particle size distribution of the sulphur particles for different surfactant concentrations (i.c. Toximul TA5) as used in Examples 2, 4, and 6-8. The sizes were calculated whilst using measurements conducted by the SEM (scanning electron microscopy) technique.

Example 9

The process of Examples 1 and 2 was repeated, except that Ethomeen T/25 (a non-ionic surfactant based on tallow amine ethoxylate, available from AkzoNobel Surface Chemistry AB (Stenungsund, Sweden)) was added directly to the PN slurry using a peristaltic pump to achieve a concentration of 0.057 wt. %, based on the total weight of the fertilizer composition.

Example 10

The process of Examples 1 and 2 was repeated, except that Biosoft N1-5 (a non-ionic surfactant based on alcohol ethoxylate, available from Stepan Company (Northfield, Ill., USA)) was added directly to the PN slurry using a peristaltic pump to achieve a concentration of 0.03 wt. %, based on the total weight of the fertilizer composition.

Figure 4:
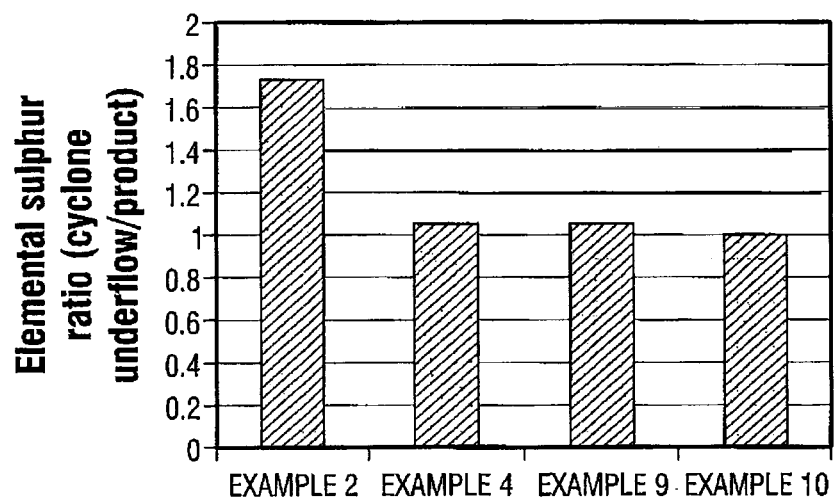
FIG. 4 presents the elemental sulphur ratios between the dryer cyclone underflows and various products.

FIG. 4 shows the elemental sulphur ratios between the dryer cyclone underflows and the product for Examples 2, 4, 9 and 10.

Discussion

As can be learned from FIG. 1, the elemental sulphur ratios between the cyclone underflows and the fertilizer composition product is significantly lower for Examples 3 and 4 according to the present invention (containing Toximul TA5 as surfactant) when compared with Examples 1 and 2. Thus, the concentration of elemental sulphur in the process dusts generated in the processes of Example 3 and 4 is significantly lower, resulting in reduced sulphur dust and explosion hazards.

FIG. 2 shows the total sulphur ratio between the cyclone overflows for a range of concentrations of the surfactant (i.e. Toximul TA5), as used in Examples 2 and 4-8, both for the dryer (Series 1) and the fugitive dust (Series 2) cyclone overflows. Total sulphur refers to the sum of elemental sulphur and sulphate sulphur. As can be learned from FIG. 2, it is preferred according to the present invention that the surfactant is present in an amount of at least 0.001 wt. %, with respect to the weight of the overall fertilizer composition.

FIG. 3 shows the average particle size distribution of the sulphur particles within the fertilizer granules (for Examples 2, 4 and 6-8). As can be learned from FIG. 3, a significant reduction (between about 30 to 50%) of the largest sulphur particle size within the fertilizer matrix is obtained. Thus, the present invention results in an important improvement of the particle size distribution, making it more adequate for agronomical uses under certain climatic conditions, allowing the elemental sulphur to oxidize in a timely fashion through the plant life cycle.

FIG. 4 shows the elemental sulphur ratios for the dryer cyclone underflow for Examples 2 (not according to the present invention as it does not contain a surfactant), 4, 9 and 10. From FIG. 4, it can be concluded that effect of the present invention can be achieved over a broad range of surfactants.

What is claimed is:

1. A process for the manufacture of sulphur-containing fertilizer compositions, said process comprising the steps of:
   a) providing a slurry of at least one phosphate-based fertilizer material selected from the group consisting of ammonium phosphates, ammonium phosphate based nitrogen-phosphorus-potassium (NPK) compounds, super phosphates and partially acidulated phosphate rocks;
   b) bringing said slurry into contact with at least one cationic or amphoteric surfactant and a liquid phase of elemental sulphur; and
   c) introducing the mixture obtained in step b) into a granulator unit in order to obtain granules of the fertilizer composition,
   wherein the elemental sulphur is present in an amount in the range of from 1 to 25 wt. % and the at least one cationic or amphoteric surfactant is present in an amount in the range of from 0.001 to 3 wt. %, based on the total weight of the fertilizer composition.

2. A process as claimed in claim 1, wherein the liquid phase of elemental sulphur comprises molten sulphur.

3. A process as claimed in claim 1, wherein the at least one cationic or amphoteric surfactant comprises an ethylene or propylene oxide adduct of an aliphatic amine, said aliphatic amine containing 12 to 20 carbon atoms.

4. A process as claimed in claim 1, wherein the at least one cationic or amphoteric surfactant is present in an amount in the range of from 0.001 wt. % to 0.05 wt. % with respect to the weight of the overall fertilizer composition.

5. A process as claimed in claim 1, wherein the at least one cationic or amphoteric surfactant is a nitrogen-containing cationic surfactant or a nitrogen-containing amphoteric surfactant.

6. A fertilizer composition comprising:
   a) elemental sulphur in an amount in the range of from 1 to 25 wt. %, based on the total weight of the fertilizer composition;
   b) at least one phosphate-based fertilizer material selected from the group consisting of ammonium phosphates, ammonium phosphate based nitrogen-phosphorus-potassium (NPK) compounds, super phosphates and partially acidulated phosphate rocks; and c) at least one cationic or amphoteric surfactant in an amount in the range of from 0.001 to 3 wt. %, based on the total weight of the fertilizer composition, wherein the cationic or amphoteric surfactant is dispersed throughout the fertilizer composition.

7. A fertilizer composition as claimed in claim 6, wherein the at least one cationic or amphoteric surfactant comprises a nitrogen-containing cationic surfactant.

8. A fertilizer composition as claimed in claim 7, wherein the at least one cationic or amphoteric surfactant comprises an ethylene or propylene oxide adduct of an aliphatic amine, said aliphatic amine containing 12 to 20 carbon atoms.

9. A fertilizer composition as claimed in claim 6, wherein the at least one cationic or amphoteric surfactant is present in an amount in the range of from 0.001 wt. % to 0.05 wt. % with respect to the weight of the overall fertilizer composition.

10. A fertilizer composition as claimed in claim 6, wherein the elemental sulphur is present in the form of particles having a size in the range of from 1 to 200 microns.

11. A fertilizer composition as claimed in claim 10, wherein the elemental sulphur is present in the form of particles having a size in the range of from 5 to 150 microns.

12. A fertilizer composition as claimed in claim 11, wherein the elemental sulphur is present in the form of particles having a size in the range of from 30 to 100 microns.

* * * * *